(12) United States Patent
Suzuki et al.

(10) Patent No.: US 9,042,940 B2
(45) Date of Patent: May 26, 2015

(54) TECHNIQUE FOR EXECUTING COMMUNICATION OF OBJECT DATA WITH MOBILE DEVICE

(71) Applicants: Takanobu Suzuki, Nagoya (JP); Hirotaka Asakura, Nagoya (JP); Munehisa Matsuda, Nagoya (JP); Satoshi Tanaka, Nagoya (JP)

(72) Inventors: Takanobu Suzuki, Nagoya (JP); Hirotaka Asakura, Nagoya (JP); Munehisa Matsuda, Nagoya (JP); Satoshi Tanaka, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 91 days.

(21) Appl. No.: 13/832,067

(22) Filed: Mar. 15, 2013

(65) Prior Publication Data

US 2013/0260819 A1    Oct. 3, 2013

(30) Foreign Application Priority Data

Mar. 30, 2012   (JP) ................. 2012-082814

(51) Int. Cl.
*H04M 1/00* (2006.01)
*H04W 88/06* (2009.01)
*H04W 8/24* (2009.01)

(52) U.S. Cl.
CPC .............. *H04W 88/06* (2013.01); *H04W 8/245* (2013.01)

(58) Field of Classification Search
CPC ..... H04W 16/16; H04W 36/36; H04W 48/18; H04W 88/06
USPC .................... 455/552.1, 41.1, 41.2; 358/1.15; 370/252
See application file for complete search history.

(56) References Cited

U.S. PATENT DOCUMENTS

| | | | |
|---|---|---|---|
| 8,089,982 | B1 | 1/2012 | Vleugels et al. |
| 8,560,012 | B2 | 10/2013 | Ohnishi et al. |
| 2007/0204049 | A1* | 8/2007 | Herrod .......................... 709/227 |
| 2009/0180451 | A1 | 7/2009 | Alpert et al. |
| 2011/0177780 | A1 | 7/2011 | Sato et al. |

(Continued)

FOREIGN PATENT DOCUMENTS

| | | | |
|---|---|---|---|
| JP | 2007-166538 A | 6/2007 |
| JP | 2011-146991 A | 7/2011 |

(Continued)

OTHER PUBLICATIONS

Wi-Fi Peer-to-Peer (P2P) Technical Specification Version 1.1 2010 Wi-Fi Alliance.

(Continued)

*Primary Examiner* — Amancio Gonzalez
(74) *Attorney, Agent, or Firm* — Banner & Witcoff, Ltd.

(57) ABSTRACT

In a case where a communication device belongs to a first wireless network for the communication device to execute a wireless communication, the communication device may execute using a wireless communication with a mobile device via the first wireless network after sending to the mobile device a first wireless setting. The first wireless setting may be for the mobile device to belong to the first wireless network and include a password. In a case where the communication device belongs to a second wireless network for the communication device to execute a wireless communication, the communication device may execute a wireless communication with the mobile device via the second wireless network after sending to the mobile device a second wireless setting. The second wireless setting may be for the mobile device to belong to the second wireless network and not including the password.

12 Claims, 4 Drawing Sheets

(56) References Cited

U.S. PATENT DOCUMENTS

| | | |
|---|---|---|
| 2011/0237241 A1 | 9/2011 | Nagasaki |
| 2011/0320611 A1 | 12/2011 | Inada et al. |
| 2012/0069772 A1 | 3/2012 | Byrne et al. |
| 2013/0260682 A1 | 10/2013 | Suzuki et al. |
| 2013/0260683 A1 | 10/2013 | Suzuki et al. |
| 2013/0260818 A1 | 10/2013 | Suzuki et al. |
| 2013/0303083 A1 | 11/2013 | Ando |

FOREIGN PATENT DOCUMENTS

| | | |
|---|---|---|
| JP | 2011-205581 A | 10/2011 |
| JP | 2012-010080 A | 1/2012 |

OTHER PUBLICATIONS

Nov. 28, 2014—(US) Non-Final Office Action—U.S. Appl. No. 13/846,511.

Nov. 21, 2014—(US) Non-Final Office Action—U.S. Appl. No. 13/832,035.

Nov. 21, 2014—(US) Non-Final Office Action—U.S. Appl. No. 13/831,983.

Mar. 17, 2015—(US) Non-Final Office Action—U.S. Appl. No. 13/831,969.

* cited by examiner

TECHNIQUE FOR EXECUTING COMMUNICATION OF OBJECT DATA WITH MOBILE DEVICE

CROSS-REFERENCE TO RELATED APPLICATION

This application claims priority to Japanese Patent Application No. 2012-082814, filed on Mar. 30, 2012, the contents of which are hereby incorporated by reference into the present application.

TECHNICAL FIELD

A technique disclosed in the present specification relates to a communication device for executing communication of object data with a mobile device.

DESCRIPTION OF RELATED ART

A technique for two communication devices to execute wireless communication is known. The two communication devices execute communication of a wireless setting according to a short-range wireless communication system (i.e., a wireless communication according to NFC (abbreviation of: Near Field Communication)). The wireless setting is a setting for executing wireless communication according to a communication system different from the NFC system (e.g., IEEE 802.11a, 802.11b). Thereby, the two communication devices become capable of executing wireless communication according to the wireless setting.

SUMMARY

The present specification discloses a technique for a communication device to appropriately execute communication with a mobile device.

The technique disclosed herein is one communication device. The communication device may comprise a first type of interface for executing a wireless communication with a mobile device and a second type of interface for executing a wireless communication with the mobile device. The communication device may comprise one or more processors and a memory that stores computer-readable instructions therein. The communication device may be capable of executing, using the second type of interface, a first type of wireless communication in which an access point different from the communication device and the mobile device is not used, and a second type of wireless communication in which the access point is used. The computer-readable instructions, when executed by the one or more processors, may cause the communication device to execute (a) in a first case where the communication device belongs to a first wireless network for the communication device to execute the first type of wireless communication, executing using the second type of interface a wireless communication of object data with the mobile device via the first wireless network after sending, using the first type of interface, to the mobile device a first wireless setting, the first wireless setting being for the mobile device to belong to the first wireless network and including a password and (b) in a second case where the communication device belongs to a second wireless network for the communication device to execute the second type of wireless communication, executing using the second type of interface a wireless communication of the object data with the mobile device via the second wireless network after sending, using the first type of interface, to the mobile device a second wireless setting, the second wireless setting being for the mobile device to belong to the second wireless network and not including the password.

The technique disclosed herein is another communication device. The communication device may be configured to be capable of selectively operating in one of a plurality of states including a parent station state in which the communication device functions as a parent station of a wireless network, a child station state in which the communication device functions as a child station of the wireless network, and a device state different from the parent station state and the child station state. The communication device may be configured to be capable of executing a specific wireless communication via the wireless network by operating in either the parent station state or the child station state in the wireless network, the communication device may comprise a first type of interface for executing a wireless communication with a mobile device and a second type of interface for executing a wireless communication with the mobile device. The communication device may comprise one or more processors and a memory that stores computer-readable instructions therein. The computer-readable instructions, when executed by the one or more processors, may cause the communication device to execute in a case where the communication device currently belongs to a specific wireless network for executing the specific wireless communication, (d) executing the wireless communication of object data with the mobile device via the specific wireless network using the second type of interface after sending, using the first type of interface, to the mobile device a third wireless setting, the third wireless setting being for the mobile device to belong to the specific wireless network and including a password, in a case where the communication device operates in the patent station state in the specific wireless network and (e) executing the wireless communication of object data with the mobile device via the specific wireless network using the second type of interface after sending, using the first type of interface, to the mobile device a fourth wireless setting, the fourth wireless setting being for the mobile device to belong to the specific wireless network and not including a password, in a case where the communication device operates in the child station state in the specific wireless network.

Moreover, a control method, a computer program, and a non-transitory computer-readable storage medium computer-readable instructions for the communication device, are also novel and useful. Further, a communication system including the communication device and the mobile device are also novel and useful.

EMBODIMENT

First Embodiment (Configuration of Communication System)

Figure 1:
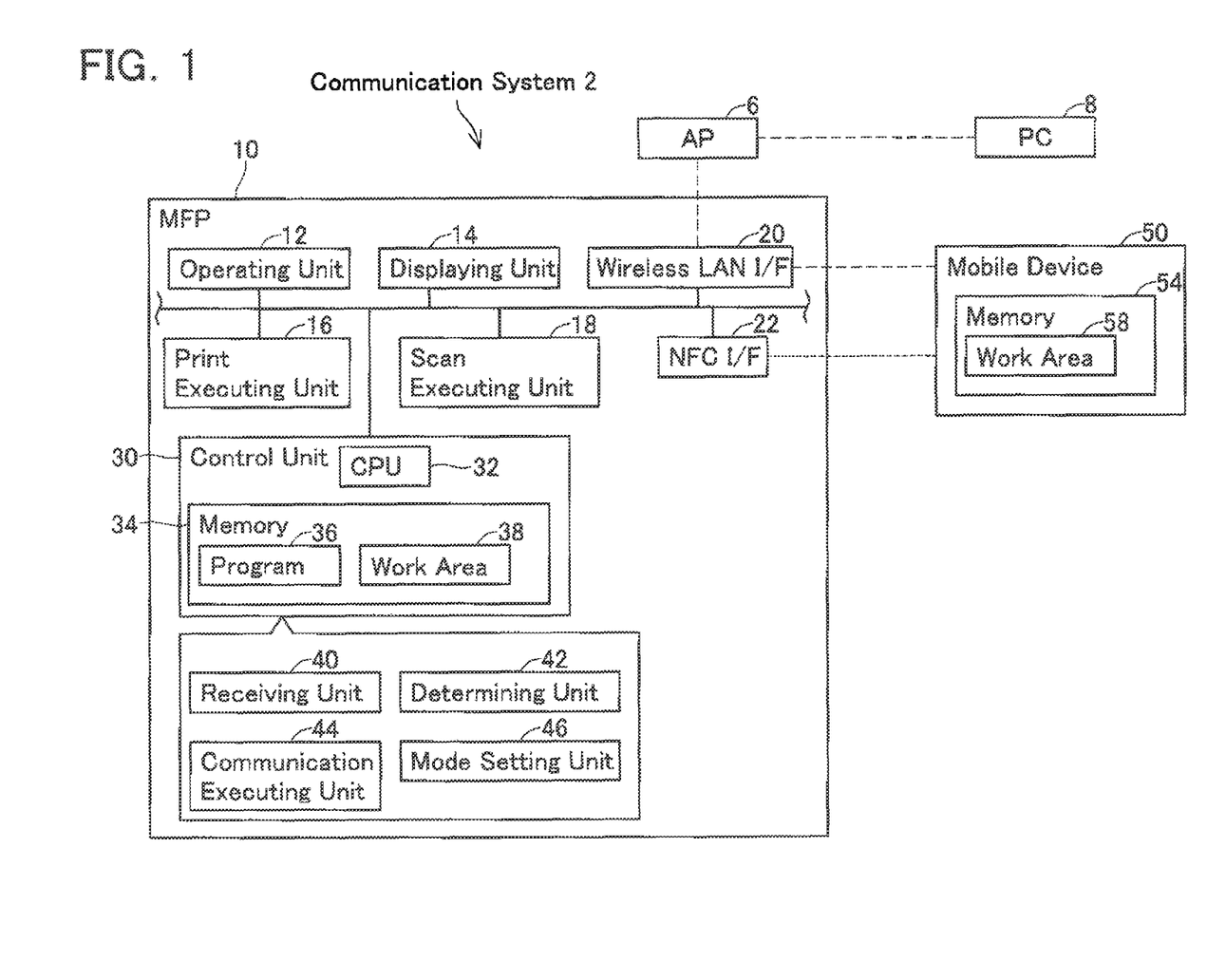
FIG. 1 shows the configuration of a communication system.

As shown in FIG. 1, a communication system 2 comprises a multi-function peripheral (called "MFP" (abbreviation of: Multi-Function Peripheral) below) 10, a mobile device 50, an access point (called "AP" below) 6, and a PC 8. The MFP 10 and the mobile device 50 are capable of executing short-range wireless communication. The short-range wireless communication is according to the wireless communication NFC system. In the present embodiment, the wireless communication is executed according to the NFC system based on international standards ISO/IEC 21481 or 18092.

Further, the MFP 10 is capable of executing wireless communication according to the Wi-Fi Direct system (to be described). Below, Wi-Fi Direct is called "WFD". In WFD, wireless communication is executed based on IEEE (abbreviation of: The Institute of Electrical and Electronics Engineers, Inc.) 802.11 standard and standards based on thereon (e.g., 802.11a, 11b, 11g, 11n, etc.). The NFC system and the system of WFD (called "WFD system" below) have different wireless communication systems (i.e., wireless communication standards). Further, the communication speed of wireless communication according to the WFD system is faster than the communication speed of wireless communication according to the NFC system.

For example, the MFP 10 can construct a WFD network by establishing a connection with the mobile device 50 according to the WFD system (called "WFD connection" below). Similarly, the MFP 10 can construct a WFD network by establishing a WFD connection with the PC 8.

The PC 8, the MFP 10 and the mobile device 50 are further capable of executing wireless communication according to a normal Wi-Fi system (e.g., IEEE 802.11) different from the WFD system. In general terms, wireless communication according to normal Wi-Fi is wireless communication using the AP 6, and wireless communication according to the WFD system is wireless communication not using the AP 6. For example, the MFP 10 can belong to a normal Wi-Fi network by establishing a connection with the AP 6 (called "normal Wi-Fi connection" below) according to normal Wi-Fi. Via the AP 6, the MFP 10 can execute wireless communication with another device belonging to the normal Wi-Fi network (e.g., the PC 8, the mobile device 50). Moreover, the NFC system and the system of normal Wi-Fi (called "the normal Wi-Fi system" below) have different wireless communication systems (i.e., wireless communication standards). Further, the communication speed of normal Wi-Fi is faster than the communication speed of NFC.

(WFD)

WFD is a standard formulated by Wi-Fi Alliance. WFD is described in "Wi-Fi Peer-to-Peer (P2P) Technical Specification Version 1.1", created by Wi-Fi Alliance.

As described above, the PC 8, the MFP 10, and the mobile device 50 are each capable of executing wireless communication according to the WFD system. Below, an apparatus capable of executing wireless communication according to the WFD system is called a "WFD-compatible apparatus". According to the WFD standard, three states are defined as the states of the WFD-compatible apparatus: Group Owner state (called "G/O state" below), client state, and device state. The WFD-compatible apparatus is capable of selectively operating in one state among the three states.

One WFD network includes an apparatus in the G/O state and an apparatus in the client state. Only one G/O state apparatus can be present in the WFD network, but one or more client state apparatuses can be present. The G/O state apparatus manages the one or more client state apparatuses. Specifically, the G/O state apparatus creates an administration list in which identification information (i.e., MAC address) of each of the one or more client state apparatuses is written. When a client state apparatus newly belongs to the WFD network, the G/O state apparatus adds the identification information of that apparatus to the administration list, and when the client state apparatus leaves the WFD network, the G/O state apparatus deletes the identification information of that apparatus from the administration list.

The G/O state apparatus is capable of wirelessly communicating object data (e.g., data that includes network layer information of the OSI reference model (print data, scan data, etc.)) with an apparatus registered in the administration list, i.e., with a client state apparatus (i.e., an apparatus belonging to the WFD network). However, with an unregistered apparatus which is not registered in the administration list, the G/O state apparatus is capable of wirelessly communicating data for the unregistered apparatus to belong to the WFD network (e.g., data that does not include network layer information (physical layer data such as a Probe Request signal, Probe Response signal, etc.)), but is not capable of wirelessly communicating the object data. For example, the MFP 10 that is in the G/O state is capable of wirelessly receiving print data from the mobile device 50 that is registered in the administration list (i.e., the mobile device 50 that is in the client state), but is not capable of wirelessly receiving print data from an apparatus that is not registered in the administration list.

Further, the G/O state apparatus is capable of relaying the wireless communication of object data (print data, scan data, etc.) between a plurality of client state apparatuses. For example, in a case where the mobile device 50 that is in the client state is to wirelessly send print data to another printer that is in the client state, the mobile device 50 first wirelessly sends the print data to the MFP 10 that is in the G/O state. In this case, the MFP 10 wirelessly receives the print data from the mobile device 50, and wirelessly sends the print data to the other printer. That is, the G/O state apparatus is capable of executing the function of an AP of the normal wireless network.

Moreover, a WFD-compatible apparatus that does not belong to the WFD network (i.e., an apparatus not registered in the administration list) is a device state apparatus. The device state apparatus is capable of wirelessly communicating data for belonging to the WFD network (physical layer data such as a Probe Request signal, Probe Response signal, etc.), but is not capable of wirelessly communicating object data (print data, scan data, etc.) via the WFD network.

Moreover, below, an apparatus that is not capable of executing wireless communication according to the WFD system, but is capable of executing wireless communication according to normal Wi-Fi is called a "WFD-incompatible apparatus". The "WFD-incompatible apparatus" may also be called a "legacy apparatus". A WFD-incompatible apparatus cannot operate in the G/O state. A G/O state apparatus can register identification information of the WFD-incompatible apparatus in the administration list.

(Configuration of MFP 10)

The MFP 10 comprises an operating unit 12, a displaying unit 14, a print executing unit 16, a scan executing unit 18, a wireless LAN interface (an "interface" is called "I/F" below) 20, an NFC I/F 22, and a control unit 30. The operating unit 12 consists of a plurality of keys. A user can input various instructions to the MFP 10 by operating the operating unit 12.

The displaying unit 14 is a display for displaying various types of information. The print executing unit 16 is an ink jet system, laser system, etc. printing mechanism. The scan executing unit 18 is a CCD, CIS, etc. scanning mechanism.

The wireless LAN I/F 20 is an interface for the control unit 30 to execute wireless communication according to the WFD system and wireless communication according to normal Wi-Fi. The wireless LAN I/F 20 is physically one interface. However, a MAC address used in wireless communication according to the WFD system (called "MAC address for WFD" below) and a MAC address used in wireless communication according to normal Wi-Fi (called "MAC address for normal Wi-Fi" below) are both assigned to the wireless LAN I/F 20. More specifically, the MAC address for the normal Wi-Fi is pre-assigned to the wireless LAN I/F 20. Using the MAC address for the normal Wi-Fi, the control unit 30 creates the MAC address for WFD, and assigns the MAC address for WFD to the wireless LAN I/F 20. The MAC address for WFD differs from the MAC address for the normal Wi-Fi. Consequently, via the wireless LAN I/F 20, the control unit 30 can simultaneously execute both wireless communication according to the WFD system and wireless communication according to the normal Wi-Fi. Consequently, a situation can be established in which the MFP 10 belongs to the WFD network and belongs to the normal Wi-Fi network.

Moreover, the G/O state apparatus can write, in the administration list, not only the identification information of the WFD-compatible apparatus that is in the client state, but also the identification information of a WFD-incompatible apparatus. That is, the G/O state apparatus can also establish the WFD connection with the WFD-incompatible apparatus. In general terms, the WFD connection is a wireless connection in which the MAC address for the WFD of the MFP 10 is used. Further, the WFD network is a wireless network in which the MAC address for the WFD of the MFP 10 is used. Similarly, the normal Wi-Fi connection is a wireless connection in which the MAC address for the normal Wi-Fi of the MFP 10 is used. Further, the normal Wi-Fi network is a wireless network in which the MAC address for the normal Wi-Fi of the MFP 10 is used.

By operating the operating unit 12, the user can change a setting of the wireless LAN I/F 20, thereby being able to change to either mode of a mode in which wireless communication according to the WFD system using the wireless LAN I/F 20 can be executed (called "WFID=ON mode" below), and a mode in which wireless communication according to the WFD system using the wireless LAN I/F 20 cannot be executed (called "WFD=OFF mode" below). A mode setting unit 46 sets the mode to either WFD=ON mode or WFD=OFF mode in accordance with the operation of the user. Specifically, the mode setting unit 46 stores, in the memory 34, a mode value representing the mode set by the user.

Moreover, in the WFD I/F=OFF mode state, the control unit 30 cannot execute processes according to the WFD system (e.g., a process of setting the MFP 10 to spontaneous G/O mode (to be described), G/O negotiation, etc.). In the WFD I/F=ON state, the memory 34 stores values representing the current state of the MFP 10 relating to WFD (the state from among G/O state, client state, and device state).

The NFC I/F 22 is an interface for the control unit 30 to execute wireless communication according to the NFC system. The NFC I/F 22 is formed of a chip differing physically from the wireless LAN I/F 20.

Moreover, the communication speed of wireless communication via the wireless LAN I/F 20 (e.g., maximum communication speed is 11 to 454 Mbps) is faster than the communication speed of wireless communication via the NFC I/F 22 (e.g., maximum communication speed is 100 to 424 Kbps). Further, the frequency of the carrier wave in wireless communication via the wireless LAN I/F 20 (e.g., 2.4 GHz band, 5.0 GHz band) differs from the frequency of the carrier wave in the wireless communication via the NFC I/F 22 (e.g., 13.56 MHz band). Further, in the case where the distance between the MFP 10 and the mobile device 50 is less than or equal to approximately 10 cm, the control unit 30 can wirelessly communicate with the mobile device 50 according to the NFC system via the NFC I/F 22. In the case where the distance between the MFP 10 and the mobile device 50 is either less than or equal to 10 cm, or is greater than or equal to 10 cm (e.g., a maximum is approximately 100 m), the control unit 30 can wirelessly communicate, via the wireless LAN I/F 20, with the mobile device 50 according to the WFD system and according to the normal Wi-Fi. That is, the maximum distance across which the MFP 10 can execute wireless communication with a communication destination apparatus (e.g., the mobile device 50) via the wireless LAN I/F 20 is greater than the maximum distance across which the MFP 10 can execute the wireless communication with the communication destination apparatus via the NFC I/F 22.

The control unit 30 comprises a CPU 32 and the memory 34. The CPU 32 executes various processes according to programs stored in the memory 34. The CPU 32 realizes the functions of the units 40 to 46 by executing processes according to the programs.

The memory 34 is formed of a ROM, RAM, hard disk, etc. The memory 34 stores the programs executed by the CPU 32. The memory 34 comprises a work area 38. In the case where the MFP 10 currently belongs to a WFD network, the work area 38 stores information indicating that the MFP 10 currently belongs to the WFD network, and a wireless setting (including authentication method, encryption method, password, SSID (Service Set Identifier) and BSSID (Basic Service Set Identifier) of the wireless network) for communicating object data (e.g., print data) via the WFD network. Further, in the case where the MFP 10 currently belongs to a normal Wi-Fi network, the work area 38 stores information indicating that the MFP 10 currently belongs to the normal Wi-Fi network, and a wireless setting for communicating object data via the normal Wi-Fi network. The SSID of the WFD network is a network identifier for identifying the WFD network, and the SSID of the normal Wi-Fi network is a network identifier for identifying the normal Wi-Fi network. The BSSID of the WFD network is an identifier unique to the G/O state apparatus (e.g., the MAC address of the G/O state apparatus), and the BSSID of the normal Wi-Fi network is an identifier unique to the AP (e.g., a unique identifier of the AP).

In the case where the MFP 10 is operating according to the WFD system, the work area 38 further stores a value indicating the current state of WFD (one state from among G/O state, client state, or device state). The work area 38 further stores a mode value representing the WFD=ON mode, or a mode value representing the WFD=OFF mode.

Moreover, by operating the operating unit 12, the user can set the MFP 10 to spontaneous G/O mode. Spontaneous G/O mode is a mode for maintaining the operation of the MFP 10 in the G/O state. The work area 38 within the memory 34 further stores a value indicating whether the MFP 10 has been set to spontaneous G/O mode. When the WFD-compatible apparatus that is in the device state is to establish a WFD connection with another WFD-compatible apparatus that is in the device state, the WFD-compatible apparatus usually executes G/O negotiation to selectively determine which state, of G/O state and client state, it is to operate in. In the case where the MFP 10 has been set to the spontaneous G/O mode, the MFP 10 maintains operation in the G/O state without executing G/O negotiation.

(Configuration of Mobile Device 50)

The mobile device 50 is, for example, a mobile phone (e.g., a Smart Phone), PDA, notebook PC, tablet PC, portable music player, portable video player, etc. The mobile device 50 comprises two wireless interfaces, a wireless LAN I/F (i.e., an interface for WFD and normal Wi-Fi) and an NFC I/F. Consequently, the mobile device 50 is capable of executing wireless communication with the MFP 10 using the wireless LAN I/F, and is capable of executing wireless communication with the MFP 10 using the NFC I/F. The mobile device 50 comprises an application program for causing the MFP 10 to execute functions (e.g., print function, scan function, etc.). Moreover, the application program may, for example, be installed on the mobile device 50 from a server provided by a vendor of the MFP 10, or may be installed on the mobile device 50 from a media shipped together with the MFP 10.

Like the MFP 10, the mobile device 50 comprises a work area 58 within a memory 54. In the case where the mobile device 50 currently belongs to the WFD network or the normal Wi-Fi network, the work area 58 stores a wireless setting (including authentication method, encryption method, password, SSID and BSSID of the wireless network) for executing communication via the relevant network. Further, in the case where the mobile device 50 is operating according to the WFD system, the work area 58 stores a state value representing the state of the mobile device 50 (i.e., one state from among G/O state, client state and device state).

(Configuration of PC 8)

The PC 8 comprises a wireless LAN I/F (i.e., an interface for WFD and normal Wi-Fi), but does not comprise an NFC I/F. Consequently, the PC 8 is capable of executing communication with the MFP 10 by using the wireless LAN I/F, but is not capable of executing wireless communication according to the NFC system. The PC 8 comprises a driver program for causing the MFP 10 to execute a process (e.g., print process, scan process, etc.). Moreover, the driver program is usually installed on the PC 8 from a media shipped together with the MFP 10. However, in a modification, the driver program may be installed on the PC 8 from a server provided by the vendor of the MFP 10.

(Configuration of AP 6)

The AP 6 is not a WFD G/O state apparatus, but is a standard access point called a wireless access point or wireless LAN router. The AP 6 can establish a normal Wi-Fi connection with a plurality of apparatuses. Thereby, a normal Wi-Fi network including the AP 6 and the plurality of apparatuses is constructed. The AP 6 receives data from one apparatus from among the plurality of apparatuses belonging to the normal Wi-Fi network, and sends the data to another one apparatus from among the plurality of apparatuses. That is, the AP 6 relays communication between a pair of apparatuses belonging to the normal Wi-Fi network.

Moreover, differences between the WFD G/O state apparatus and the normal AP are as follows. In the case where the WFD G/O state apparatus disconnects from the WFD network to which it currently belongs, and newly belongs to another WFD network, the WFD G/O state apparatus can operate in a state other than the G/O state (i.e., the client state). By contrast, a normal AP (i.e., the AP 6) executes the function of relaying communication between the pair of apparatuses regardless of which normal Wi-Fi network the normal AP belongs to, and the normal AP cannot operate in the client state.

(Communication Process Executed by MFP 10)

A communication process executed by the MFP 10 will be described with reference to FIG. 2. When a power source of the MFP 10 is turned ON, the control unit 30 executes a communication process. In S2, a receiving unit 40 monitors whether NFC information has been received by executing wireless communication according to the NFC system. Moreover, the receiving unit 40 receives the NFC information via the NFC I/F 22. Specifically, the receiving unit 40 monitors whether an NFC communication session has been established between the MFP 10 and the mobile device 50. While the power source of the MFP 10 is ON, the receiving unit 40 causes the NFC I/F 22 to transmit radio waves for detecting a device capable of executing wireless communication according to the NFC system.

The user of the mobile device 50 activates the application program. By operating the mobile device 50, the user causes the mobile device 50 to create NFC information that includes a process execution instruction (e.g., print instruction, scan instruction) indicating a process that the MFP 10 is to execute. In the case where the mobile device 50 currently belongs to a wireless network, the NFC information further includes the SSID and BSSID of the wireless network to which the mobile device 50 currently belongs. Moreover, the case where the mobile device 50 currently belongs to the wireless network is a case in which a wireless connection, this being the WFD connection or the normal Wi-Fi connection, or both, has been established between the mobile device 50 and another device (e.g., the AP 6, the MFP 10).

The user can bring the mobile device 50 closer to the MFP 10. Thereby, when the distance between the mobile device 50 and the MFP 10 becomes less than the distance (e.g., 10 cm) where the radio waves reach each other, the mobile device 50 receives a radio wave from the MFP 10, and sends a response wave to the MFP 10. Consequently, the control unit 30 receives the response wave from the mobile device 50, and an NFC communication session is established. When the NFC communication session has been established, the mobile device 50 sends the created NFC information to the MFP 10.

Upon receiving the NFC information (YES in S2), in S4 a determining unit 42 determines whether the MFP 10 currently belongs to a network. Specifically, in the case where the work area 38 stores information indicating that the MFP 10 currently belongs to the WFD network or information indicating that the MFP 10 currently belongs to the normal Wi-Fi network, or both, the determining unit 42 determines that the MFP 10 currently belongs to a wireless network (YES in S4), and the process proceeds to S6. On the other hand, in the case where neither the information indicating that the MFP 10 currently belongs to the WFD network or the information indicating that the MFP 10 currently belongs to the normal Wi-Fi network is stored in the work area 38, the determining unit 42 determines that the MFP 10 does not currently belong to a wireless network (NO in S4), and the process proceeds to S8.

In S6, the determining unit 42 confirms whether the mobile device 50 currently belongs to the network to which the MFP 10 currently belongs. Specifically, the determining unit 42 first determines whether the SSID and BSSID of the network to which the mobile device 50 currently belongs are included in the NFC information. In the case where the SSID and BSSID are not included in the NFC information, the determining unit 42 determines that the mobile device 50 does not currently belong to the network to which the MFP 10 currently belongs (NO in S6). According to this configuration, the MFP 10 can appropriately determine that the mobile device 50 does not currently belong to the network to which the MFP 10 currently belongs. In the case where the SSID and BSSID of the network to which the mobile device 50 currently belongs are included in the NFC information, the determining unit 42 determines whether the SSID and BSSID included in the wireless setting stored in the work area 38 are identical to the SSID and BSSID included in the NFC information.

In the case where the SSIDs and BSSIDs are both identical, it is determined that the mobile device 50 currently belongs to the network to which the MFP 10 currently belongs (YES in S6), and the process proceeds to S7. On the other hand, in the case where the SSIDs or the BSSIDs, or both are not identical, it is determined that the mobile device 50 does not currently belong to the network to which the MFP 10 currently belongs (NO in S6), and the process proceeds to S8. According to this configuration, the MFP 10 can appropriately determine whether the mobile device 50 currently belongs to the network to which the MFP 10 currently belongs. Moreover, in S6 the determining unit 42 determines whether the SSIDs are identical, and whether the BSSIDs are identical. Thereby, the determining unit 42 can determine whether the MFP 10 and the mobile device 50 belong to the same wireless network constructed by the same AP. More specifically, one AP may construct a plurality of wireless networks by using a plurality of SSIDs. Consequently, in the case where the BSSIDs are identical and the SSIDs are not identical, the MFP 10 and the mobile device 50 could belong to different wireless networks constructed by the same AP. In the present embodiment, it is possible to determine more reliably whether the MFP 10 and the mobile device 50 belong to the same wireless network by determining whether both the SSIDs and BSSIDs are identical. Moreover, in a modification, it is determined in S6 whether the SSIDs are identical, but it need not be determined whether the BSSIDs are identical. Thereby, if the SSIDs are identical, it can be determined that the MFP 10 and the mobile device 50 belong to the same wireless network even in the case where the MFP 10 and the mobile device 50 each belong to a wireless network constructed by a different access point.

In the case where the mobile device 50 currently belongs to the network to which the MFP 10 currently belongs, the MFP 10 and the mobile device 50 can execute communication via the network to which they currently belong. That is, the mobile device 50 can execute wireless communication with the MFP 10 by using the wireless setting currently stored in the work area 58. In S7 the control unit 30 sends, without changing the wireless setting of the mobile device 50, information indicating setting change is unnecessary via the NFC I/F 22, this information indicating setting change is unnecessary indicating that the communication of data can be executed, and the process proceeds to S20. Moreover, the information indicating setting change is unnecessary includes the IP address of the MFP 10.

In S8 the determining unit 42 determines whether WFID=ON mode has been set. In the case where the mode value stored in the memory 34 is a value representing WFD=ON mode, the determining unit 42 determines YES in S8, and proceeds to S11. On the other hand, in the case where the mode value stored in the memory 34 is a value representing WFD=OFF mode, the determining unit 42 determines NO in S8, and the process proceeds to S9.

In S9, the determining unit 42 determines whether the MFP 10 currently belongs to a normal Wi-Fi network. In the case where information indicating that the MFP 10 currently belongs to a normal Wi-Fi network is being stored in the work area 38, the determining unit 42 determines that the MFP 10 currently belongs to the normal Wi-Fi network (YES in S9), and the process proceeds to S21. On the other hand, in the case where information indicating that the MFP 10 currently belongs to the normal Wi-Fi network is not being stored in the work area 38, the determining unit 42 determines that the MFP 10 does not currently belong to the normal Wi-Fi network (NO in S9), and the process proceeds to S10.

In S10 a communication executing unit 44 changes the mode from WFD=OFF mode to WFD=ON mode by changing the mode value stored in the memory 34, and the process proceeds to S15. The communication executing unit 44 further stores, in the memory 34, setting change information indicating that the mode value has been changed.

In S11 the determining unit 42 determines whether the MFP 10 is operating in the client state in the wireless network to which it currently belongs. Specifically, in the case where the state value stored in the work area 38 is a value representing the client state, the determining unit 42 determines that the MFP 10 is operating in the client state (YES in S11). On the other hand, in the case where the state value stored in the work area 38 is not a value representing the client state, the determining unit 42 determines that the MFP 10 is not operating in the client state (NO in S11). In the case of YES in S11, the process proceeds to S13, and in the case of NO in S11, the process proceeds to S12.

In S13, the communication executing unit 44 sends a wireless setting which, of the G/O wireless settings being stored in the work area 38, does not include the password, to the mobile device 50 via the NFC I/F 22, and the process proceeds to S22.

Upon receiving the G/O wireless setting, the mobile device 50 causes the user to specify a password. When a password has been specified by the user, the mobile device 50 establishes the connection with the G/O state device by using the wireless setting received from the MFP 10 and the password specified by the user. Thereby, the mobile device 50 becomes capable of wireless communication with the MFP 10 via the G/O state device. Moreover, in the case where the connection cannot be established between the mobile device 50 and the G/O state device, the MFP 10 cannot execute wireless communication with the mobile device 50. In this case, the control unit 30 returns to S2 without executing the processes from S22 and on.

Moreover, in a variant, the mobile device 50 may store, in the memory 54, a wireless setting that was formerly used to belong to a network. In this case, upon receiving the wireless setting not including the password, the mobile device 50 may specify, from the memory 54, a wireless setting which includes an SSID identical to the SSID included in the received wireless setting, and also includes a password. Thereupon, the mobile device 50 may establish a WFD connection with the PC 8 by using the wireless setting specified from the memory 54.

In S12 the determining unit 42 determines whether the MFP 10 is operating in the G/O state in the wireless network to which it currently belongs. Specifically, in the case where the state value stored in the work area 38 is a value representing the G/O state, the determining unit 42 determines that the MFP 10 is operating in the G/O state (YES in S12). On the other hand, in the case where the state value stored in the work area 38 is not a value representing the G/O state, the determining unit 42 determines that the MFP 10 is not operating in the G/O state (i.e., the MFP 10 is in the device state) (NO in S12). In the case of YES in S12, the process proceeds to S14, and in the case of NO in S12, the process proceeds to S20.

Moreover, in a variant, in the case of YES in S12, the determining unit 42 may determine whether the number of apparatuses other than the MFP 10 which are included in the WFD network in which the MFP 10 is operating in the G/O state (i.e., apparatuses which have established a connection with the MFP 10) is less than a predetermined maximum client number. In the case of determining that the number of identification information of apparatuses being stored in the administration list is identical to the maximum client number, the communication executing unit 44 may send, by using the NFC I/F 22, information to the mobile device 50 indicating that wireless communication with the mobile device 50 cannot be executed. On the other hand, in the case of determining that the number of identification information of apparatuses being stored in the administration list is less than the maximum client number, the process may proceed to S14.

In S14 the communication executing unit 44 sends the wireless setting of the MFP 10 stored in the work area 38 to the mobile device 50 via the NFC I/F 22, and the process proceeds to S18. The wireless setting of the MFP 10 sent in S14 includes the password.

The process of S20 is similar to the process of S9. The process proceeds to S15 in the case of NO in S20, and proceeds to S21 in the case of YES in S20.

In S15 the communication executing unit 44 sets the MFP 10 to spontaneous G/O mode. Spontaneous G/O mode is a mode which keeps the MFP 10 operating in the G/O state. Consequently, the MFP 10 is set to the G/O state although a WFD network has not been constructed at the stage of S15. In the case where the MFP 10 is set to the G/O state, the communication executing unit 44 prepares a wireless setting (SSID, BSSID, authentication method, encryption method, password, etc.) for the WFD-compatible apparatus and/or the WFD-incompatible apparatus to execute wireless communication, via the WFD network, with the MFP 10 that is operating in the G/O state. According to this configuration, the MFP 10 can execute wireless communication with the apparatus that receives the wireless setting from the MFP 10 regardless of whether the apparatus that receives the wireless setting (the mobile device 50 in the present embodiment) is a WFD-compatible apparatus or a WFD-incompatible apparatus.

Moreover, the authentication method and encryption method are predetermined. Further, the communication executing unit 44 creates a password. Moreover, the SSID may be created by the communication executing unit 44 at the time the password is created, or may be predetermined. The BSSID is the MAC address of the MFP 10. Moreover, at this stage, identification information of the apparatus connected with the G/O state apparatus is not described in the administration list managed by the MFP 10.

In S16, the communication executing unit 44 sends the prepared wireless setting to the mobile device 50 using the NFC I/F 22. In the case where process S16 is executed after process S15, the communication executing unit 44 sends, to the mobile device 50, the wireless setting which was prepared at the stage of setting the spontaneous G/O mode (S15). In the case where process S14 is executed after process S12, the communication executing unit 44 uses the NFC I/F 22 to send, to the mobile device 50, the wireless setting which was prepared at the stage of constructing the WFD network in which the MFP 10 is operating in the G/O state.

Next, in S18 the communication executing unit 44 establishes a WFD connection between the MFP 10 and the mobile device 50 by using the wireless LAN I/F 20. Upon receiving, from the MFP 10, the wireless setting of the MFP 10 that is operating in the G/O state, the mobile device 50 stores the received wireless setting in the work area 58. Consequently, the mobile device 50 executes the following processes according to normal Wi-Fi. Next, the communication executing unit 44 executes the wireless communication of an Authentication Request, Authentication Response, Association Request, Association Response, and 4 way handshake with the mobile device 50. Various authentication processes such as authentication of SSID, authentication of authentication method and encryption method, authentication of password, etc. are executed during the course of the wireless communication. In a case where all the authentications succeed, a wireless connection is established between the MFP 10 and the mobile device 50.

Moreover, in the process S18, the communication executing unit 44 acquires the MAC address of the mobile device 50 by using the wireless LAN I/F 20. When the wireless connection has been established, the control unit 30 further adds the MAC address of the mobile device 50 to the administration list. Moreover, the MAC address of the mobile device 50 is included in the NFC information. Thereby, the MFP 10 that is in the G/O state becomes able to communicate object data (print data, scan data, etc.) with the mobile device 50 according to the normal Wi-Fi. Moreover, the object data includes network layer data, which is a layer higher than the physical layer of the OSI reference model. Consequently, the MFP 10 that is in the G/O state can execute wireless communication of the network layer with the mobile device 50 that is in the client state. When S18 ends, the process proceeds to S22.

In S21, the communication executing unit 44 sends a wireless setting for belonging to the normal Wi-Fi network and that is being stored in the work area 38, i.e., sends a wireless setting which, of the wireless settings of an AP (e.g. the AP 6), does not include the password, to the mobile device 50 via the NFC interface 22, and the process proceeds to S20. Upon receiving the wireless setting of the AP, the mobile device 50 establishes a connection with the AP by using the wireless setting received from the MFP 10 and the password specified by the user, as in the case of S13. Thereby, the mobile device 50 becomes capable of wireless communication with the MFP 10 via the AP. Moreover, in the case where a connection is not established between the mobile device 50 and the AP, the MFP 10 cannot execute wireless communication with the mobile device 50. In this case, the control unit 30 returns to S2 without executing the processes from S22 onwards.

Next, in S22 the communication executing unit 44 executes a data communication process with the mobile device 50 via the wireless LAN I/F 20. The contents of the data communication process vary depending on the contents of the process execution instruction included in the NFC information. In the case where the process execution instruction is a print instruction, the communication executing unit 44 receives print data from the mobile device 50 in the data communication process. In this case, the control unit 30 causes the print executing unit 16 to execute a print process using the received print data.

On the other hand, in the case where the process execution instruction is a scan instruction, the control unit 30 causes the scan executing unit 18 to scan a document that has been set on the scan executing unit 18, creating scan data. Next, the communication executing unit 44 sends the created scan data to the mobile device 50.

Next, in S23 the communication executing unit 44 monitors, by using the wireless LAN I/F 20, whether a disconnection request for disconnecting the connection with the mobile device 50 has been received from the mobile device 50. In the case where a disconnection request has not been received even though a predetermined time has elapsed (NO in S23), the process returns to S2. On the other hand, in the case where a disconnection request has been received from the mobile device 50 within a predetermined time since the ending of the data communication process of S20 (YES in S23), the communication executing unit 44 disconnects the wireless connection with the mobile device 50. Specifically, the communication executing unit 44 deletes the MAC address of the mobile device 50 within the administration list. Next, in S24 the communication executing unit 44 determines whether the setting of the wireless LAN I/F 20 was changed by the process S9. Specifically, in the case where setting change information is being stored in the memory 34, the communication executing unit 44 determines that the mode value was changed in S9 from the mode value indicating WFD=OFF mode to the mode value indicating WFD=ON mode (YES in S24), and proceeds to S25. On the other hand, in the case where setting change information is not being stored in the memory 34, the communication executing unit 44 determines that the mode value was not changed in S9 from the mode value indicating WFD=OFF mode to the mode value indicating WFD=ON mode (NO in S24), and the process returns to S2.

In S25, the communication executing unit 44 determines whether an external device (e.g., the PC 8) other than the mobile device 50 currently belongs to the WFD network newly constructed in S18. Specifically, in the case where identification information other than the identification information of the mobile device 50 is included in the administration list, the communication executing unit 44 determines that the external device currently belongs to the WFD network (YES in S25). In this case, without changing the mode value, the process returns to S2. According to this configuration, it is possible to prevent the MFP 10 from being disconnected from the WFD network in the case where the external device currently belongs to the WFD network.

On the other hand, in the case where identification information other than the mobile device 50 is not included in the administration list, the communication executing unit 44 determines that the external device does not currently belong to the WFD network (NO in S25), and proceeds to S26. In S26 the communication executing unit 44 changes the mode value from the mode value indicating WFD=ON mode to the mode value indicating the WFD=OFF mode, and the process returns to S2. That is, in the communication process, in the case where it is determined in S8 that the mode value is the WFD=OFF mode, the mode value is changed from the WFD=OFF mode to the WFD=ON mode so that wireless communication with the mobile device 50 is executed temporarily via the WFD network by using the wireless LAN I/F 20. When the mode value is changed from the WFD=ON mode to the WFD=OFF mode in S26, the WFD network constructed in S18 ceases to exist. According to this configuration, in the case where the mode value was changed from the mode value indicating WFD=OFF mode to the mode value indicating the WFD=ON mode during the communication process, it is possible to return to the setting from before the mode value was changed.

Advantages of Present Embodiment

Advantages of the present embodiment in first to third situations will be described with reference to FIGS. 3 to 5. Moreover, processes corresponding to the communication process of FIG. 2 are shown in each of FIGS. 3 to 5.

(First Situation)

Figure 3:
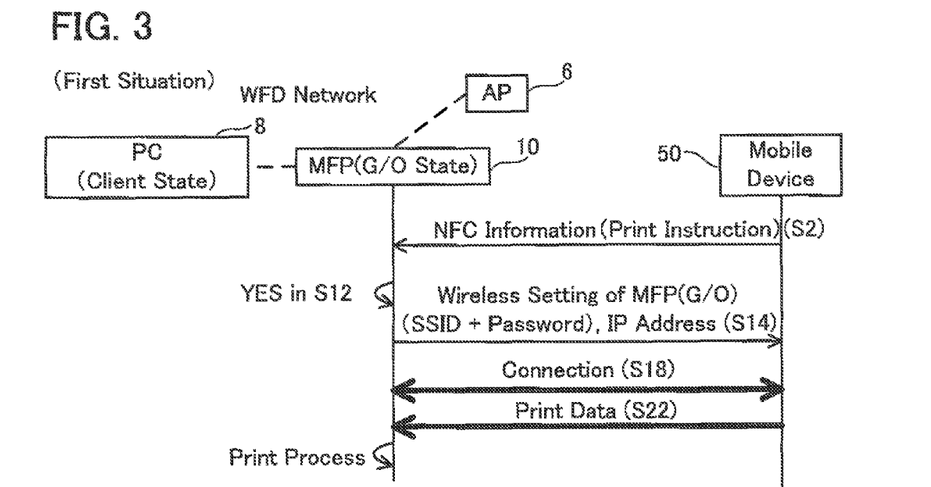
FIG. 3 shows a sequence view for explaining processes executed by devices in a first situation.

In the first situation shown in FIG. 3, the MFP 10 currently belongs to the WFD network. The MFP 10 is operating in the G/O state in the WFD network. The PC 8 that is in the client state currently belongs to the WFD network. The MFP 10 currently belongs also to a normal Wi-Fi network. The AP 6 currently belongs to the normal Wi-Fi network. The mobile device 50 does not currently belong to the wireless network to which the MFP 10 currently belongs. The mobile device 50 may currently belong, or may not belong, to a wireless network other than the wireless network to which the MFP 10 currently belongs.

Moreover, in the sequence view of the present specification, the wireless communication executed by the MFP 10 by using the NFC I/F 22 (i.e., wireless communication according to the NFC system), and the wireless communication executed by the MFP 10 by using the wireless LAN I/F 20 (i.e., wireless communication according to the WFD system or normal Wi-Fi) is represented by arrows. The arrows representing the wireless communication using the wireless LAN I/F 20 are fatter than the arrows representing the wireless communication using the NFC I/F 22.

In this situation, upon receiving NFC information from the mobile device 50 by using the NFC I/F 22, in S12 the MFP 10 determines that the MFP 10 is in the G/O state (YES in S12). Moreover, in the case where the mobile device 50 currently belongs to a wireless network, the NFC information includes the SSID and BSSID of the wireless network and, in the case where the mobile device 50 does not currently belong to a wireless network, the NFC information does not include the SSID and BSSID of the wireless network. In this case, in S14 the MFP 10 sends the IP address of the MFP 10 and a wireless setting of the MFP 10 which, of the wireless settings of the MFP 10 that are being stored in the work area 38, includes the password, to the mobile device 50 by using the NFC I/F 22. Upon receiving the wireless setting, the mobile device 50 stores the received wireless setting in the work area 58. Next, the MFP 10 and the mobile device 50 establish a WFD connection (S18). Thereby, the mobile device 50 can belong to the WFD network to which the MFP 10 currently belongs. Moreover, by using the NFC I/F 22, the MFP 10 sends a wireless setting including the authentication method and the encryption method of the MFP 10 to the mobile device 50. According to this configuration, the mobile device 50 can execute an authentication process according to the authentication method and encryption method received from the MFP 10, and need not execute any process to verify whether an authentication method and encryption method is to be used. Consequently, the MFP 10 and the mobile device 50 can establish a connection comparatively promptly.

Next, the mobile device 50 sends print data to the MFP 10 by using the wireless setting stored in the work area 58 and the IP address received in S14. The MFP 10 receives the print data by using the wireless LAN I/F 20 (S22). Upon receiving the print data, the MFP 10 causes the print executing unit 16 to execute a print process. According to this configuration, in the case where the MFP 10 is operating in the G/O state in the WFD network, the MFP 10 can appropriately execute the communication of print data with the mobile device 50 via the WFD network to which the MFP 10 currently belongs.

Further, the MFP 10 currently belongs to both a WFD network and a normal Wi-Fi network. In this case, the mobile device 50 sends a wireless setting for belonging to the WFD network (i.e., the wireless setting of the MFP 10 that is in the G/O state). On the other hand, the MFP 10 does not send a wireless setting (i.e., the wireless setting of the AP 6) for the mobile device 50 to belong to the normal Wi-Fi network. According to this configuration, the MFP 10 can prioritize sending of the wireless setting of the MFP 10 to the mobile device 50. If the MFP 10 sends a wireless setting for belonging to the normal Wi-Fi network (i.e., the wireless setting of the AP 6), the MFP 10 sends the wireless setting that does not include the password. In this case, in the case where the mobile device 50 and the user of the mobile device 50 do not know the password, the mobile device 50 cannot belong to the normal Wi-Fi network. That is, the MFP 10 and the mobile device 50 cannot execute the wireless communication of the object data. In this configuration, occurrence of a situation as described above can be avoided.

(Second Situation)

Figure 4:
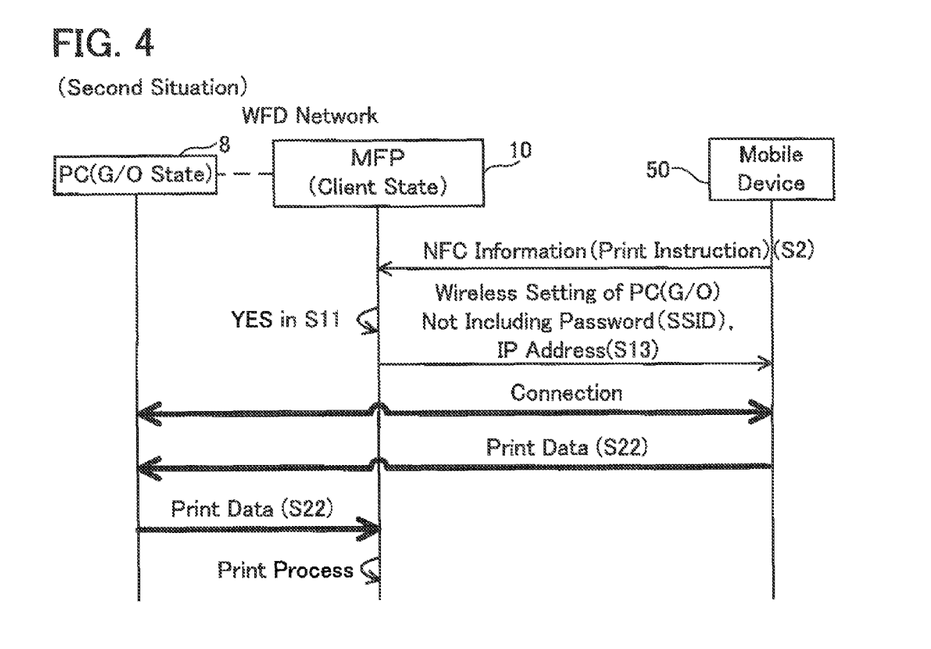
FIG. 4 shows a sequence view for explaining processes executed by devices in a second situation.

In the second situation shown in FIG. 4, the MFP 10 cunently belongs to a WFD network. The MFP 10 is operating in the client state in the WFD network. The PC 8 which is in the G/O state currently belongs to the WFD network, but the mobile device 50 does not currently belong to the WFD network. The mobile device 50 is in the same state as in the first situation.

In this situation, upon receiving NFC information from the mobile device 50 by using the NFC I/F 22, in S11 the MFP 10 determines that the MFP 10 is in the client state (YES in S11). In this case, in S13 the MFP 10 sends the IP address of the MFP 10 and a wireless setting, this not including the password, from among the wireless settings of the PC 8 that is operating in the G/O state, to the mobile device 50 by using the NFC I/F 22. According to this configuration, the password need not be provided to the mobile device 50 and the user. Consequently, in the case where the mobile device 50 and the user do not know the password for belonging to the WFD network in which the PC 8 is operating in the G/O state, the mobile device 50 can be prevented from entering the WFD network.

Upon receiving the wireless setting, the mobile device 50 stores the received wireless setting in the work area 58. Next, the mobile device 50 displays a password specifying screen on a displaying unit of the mobile device 50. The user can specify a password by operating a control unit of the mobile device 50. When the password is specified by the user, the mobile device 50 establishes a WFD connection with the PC 8. Thereby, the mobile device 50 can belong to the WFD network to which the MFP 10 currently belongs. The mobile device 50 operates in the client state in the WFD network.

Upon belonging to the WFD network, the mobile device 50 sends print data to the MFP 10 by executing wireless communication via the PC 8 by using the wireless setting stored in the work area 58 and the IP address of the MFP 10 received in S13. The MFP 10 receives the print data from the PC 8 by using the wireless LAN I/F 20 (S22) and, upon receiving the print data, causes the print executing unit 16 to execute the print process.

(Third Situation)

Figure 5:
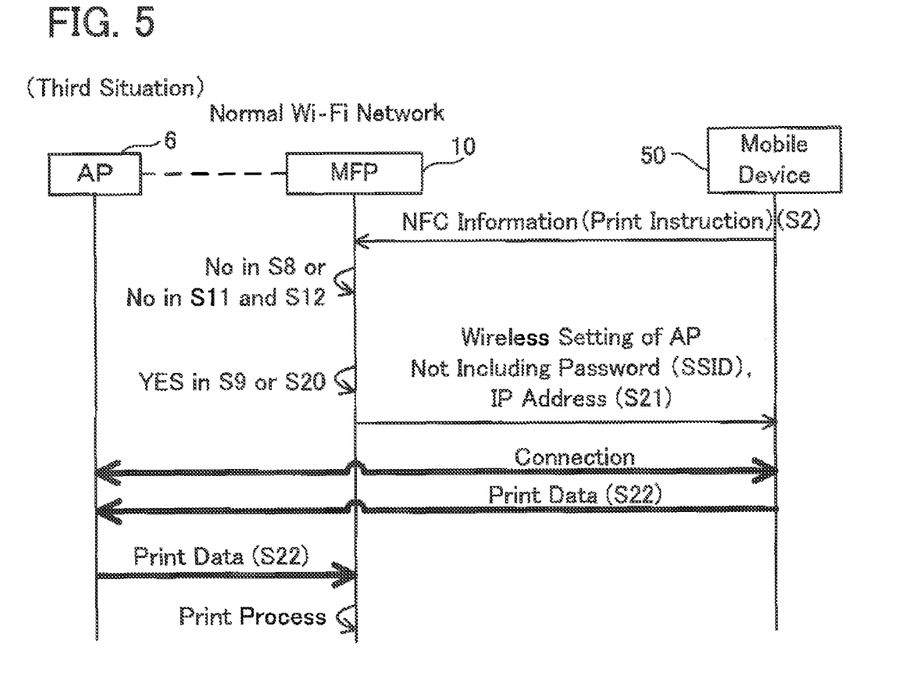
FIG. 5 shows a sequence view for explaining processes executed by devices in a third situation.

In the third situation shown in FIG. 5, the MFP 10 currently belongs to normal Wi-Fi. The MFP 10 is connected with the AP 6 in the normal Wi-Fi. On the other hand, the MFP 10 does not currently belong to a WFD network. The mobile device 50 is in the same state as in the first situation.

In this situation, upon receiving NFC information from the mobile device 50 by using the NFC I/F 22, the MFP 10 determines that the MFP 10 does not belong to a WFD network (NO in S8, or NO in S11 and S12). That is, the MFP 10 does not have a wireless setting of a WFD network for which sending is to be prioritized.

In this case, in S21 the MFP 10 sends, from among the wireless settings of the AP 6 being stored in the work area 38, the wireless setting that does not include the password to the mobile device 50. According to this configuration, a password need not be provided to the mobile device 50 and the user. Consequently, in the case where the mobile device 50 and the user do not know the password for belonging to the normal Wi-Fi network in which the AP 6 is used, the mobile device 50 can be prevented from belonging to the normal Wi-Fi network.

Upon receiving the wireless setting, the mobile device 50 receives the wireless setting as in the second situation, and causes the user to specify a password. Next, when the password has been specified by the user, the mobile device 50 establishes a normal Wi-Fi connection with the AP 6. Thereby, the mobile device 50 can belong to the normal Wi-Fi network to which the MFP 10 currently belongs. The mobile device 50 can send print data to the MFP 10 via the AP 6. Upon belonging to the normal Wi-Fi network, the mobile device 50 can send the print data to the MFP 10 by executing wireless communication via the AP 6 by using the wireless setting that is being stored in the work area 58, and the IP address of the MFP 10 received in S21.

In the present embodiment, the MFP 10 changes whether the wireless setting to be sent to the mobile device 50 includes or does not include the password in accordance with whether the MFP 10 currently belongs to a WFD network or currently belongs to a normal Wi-Fi network. In the case where the MFP 10 is connected with the AP 6 (i.e., currently belongs to a normal Wi-Fi network), and the MFP 10 sends the wireless setting of the AP 6 including the password, the situation could occur where an administrator of the network to which the AP 6 belongs allows an unintended mobile device 50 to enter the network. The MFP 10 can prevent the above situation from occurring.

On the other hand, in the case where the MFP 10 is operating in the G/O state in the network to which it currently belongs, the MFP 10 sends, to the mobile device 50, a wireless setting including a password for the mobile device 50 to belong to the network. According to this configuration, the MFP 10 can execute the communication of the object data with the mobile device at a comparatively fast communication speed by using the wireless LAN I/F 20.

(Corresponding Relationships)

The MFP 10 is an example of the "communication device", the NFC I/F 22 is an example of the "first type of interface", and the wireless LAN I/F 20 is an example of the "second type of interface". Moreover, from the above description, the NFC I/F 22 (i.e., the "first type of interface") can be called an interface used for communication executed between the MFP 10 (i.e., the "communication device") and the mobile device 50 using the wireless LAN I/F 20 (i.e., the "second type of interface").

The AP 6 is an example of the "access point". That is, the "access point" is a device that, within a network to which the access point belongs, relays communication between a pair of apparatuses belonging to the normal Wi-Fi network network.

The wireless communication performed in accordance with the WFD system is an example of "first type of wireless communication", and the wireless communication performed in accordance with the normal Wi-Fi network system is an example of "second type of wireless communication". The WFD network is an example of the "first wireless network", and the normal Wi-Fi network network is an example of the "second wireless network". The G/O state is an example of the "parent station state", and the client state is an example of the "child station state".

Figure 2:
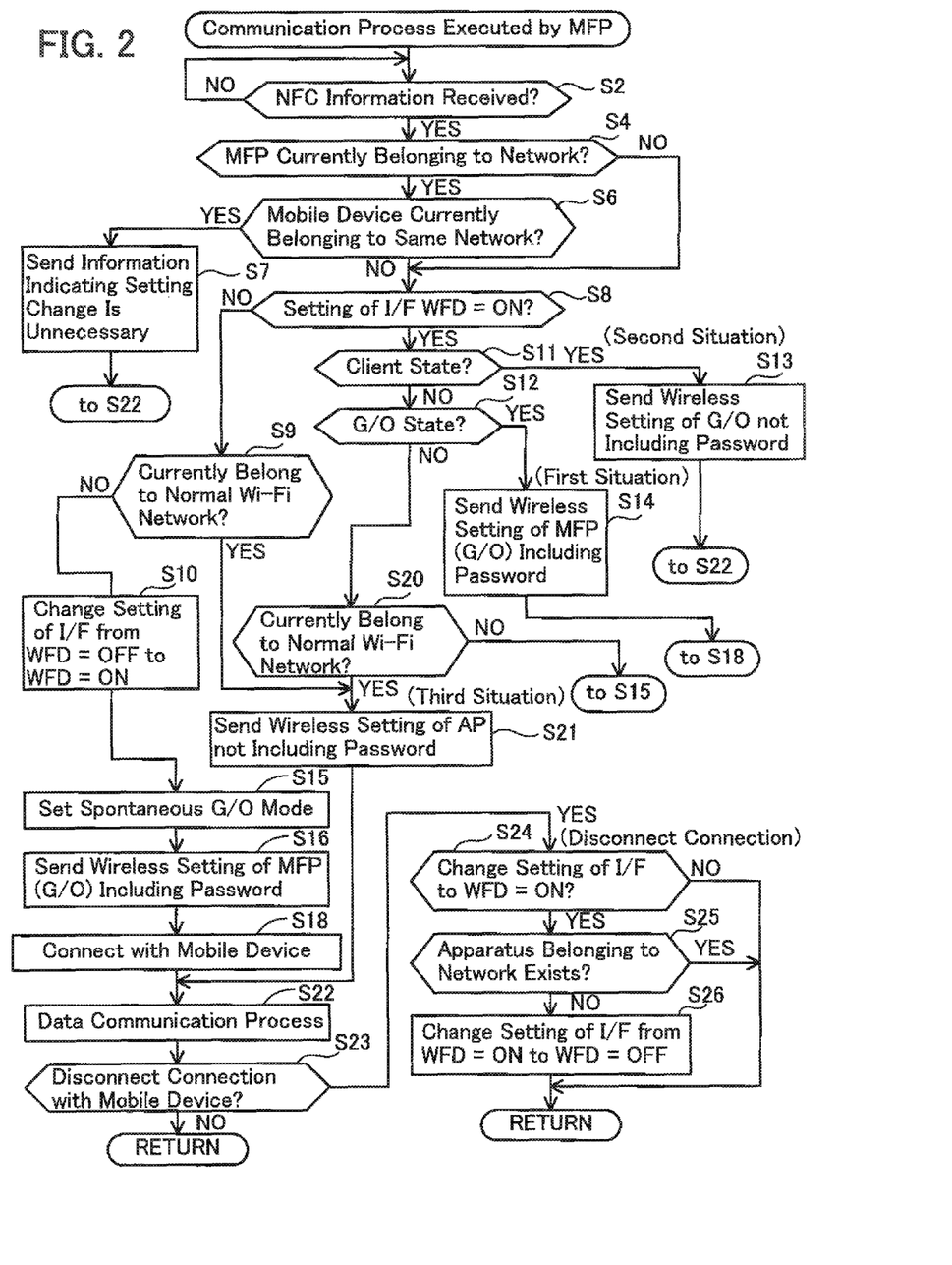
FIG. 2 shows a flowchart of a communication process executed by a multi-function peripheral.

The wireless setting sent in S14 of FIG. 2 is an cxamlcexample of "first wireless setting" and "third wireless setting", the wireless setting sent in S21 is an example of "second wireless setting", and the wireless setting sent in S13 is an example of "fourth wireless setting".

(Variants)

(1) In the above embodiment, upon receiving NFC information (YES in S2), the MFP 10 determines whether it currently belongs to a network (S4) and, in the case of determining that it belongs to a network (YES in S4), determines whether the MFP 10 and the mobile device 50 currently belong to an identical network (S6). However, the process S6 may be omitted. That is, upon receiving NFC information (YES in S2), the MFP 10 determines whether it currently belongs to a network (S4) and, in the case of determining that it currently belongs to a network (YES in S4), may proceed to the processes from S8 onwards.

(2) The "communication device" is not restricted to the multi-function peripheral, but may be another apparatus comprising the first type of interface and the second type of interface (e.g., printer, FAX device, copier, scanner, etc.).

(3) The MFP 10 may store an AP program for functioning as an access point. The control unit 30 may activate the AP program, and store a predetermined wireless setting in the work area 38. In this case, the determining unit 42 may determine whether the AP program is currently activated together with, or instead of, S8, S11, S12 of FIG. 2. In the case where it is determined that the AP program is currently activated, the wireless setting that is being stored in the work area 38 and that includes the password may be sent to the mobile device 50. In the present variant, the wireless communication executed by the mobile device 50 and the MFP 10 that is operating according to the AP program is an example of the "first type of wireless communication".

(4) The combination of the "first type of interface" and the "second type of interface" is not restricted to the combination of the NFC I/F and the wireless LAN I/F. For example, in the case where the wireless LAN I/F is adopted as the "second type of interface", the "first type of interface" may be an interface for executing infrared communication, an interface for executing Bluetooth (registered trademark), or an interface for executing Transfer Jet. Further, in the case where the NFC I/F is adopted as the "first type of interface", the "second type of interface" may be an interface for executing wired communication, or an interface for executing Bluetooth (registered trademark). In general terms, the combination of the interfaces may be any combination whereby the communication speed of communication via the second type of interface is faster than the communication speed of communication via the first type of interface.

(5) In the above embodiments, the communication speed of the communication using the "second type of interface" is faster than communication speed of the communication using the "first type of interface". However, the communication speed of the communication using the "first type of interface" may be equal to or faster than the communication speed of the communication using the "second type of interface".

(6) The "first type of interface" and the "second type of interface" may physically be two interfaces (i.e., two separate IC chips), as in the above embodiments, or may physically be one interface (i.e., two types of communication are realized with one IC chip).

(7) In the above embodiments, the interface for executing wireless communication according to the WFD system and the interface for executing wireless communication according to normal Wi-Fi was physically one interface (the wireless LAN I/F 20). However, it may physically be a plurality of interfaces (i.e., two separate IC chips). In the present modification, the plurality of interfaces is an example of the "second type of interface".

(8) In the above embodiments, the units 40 to 46 are realized by software. However, one or more of the units 40 to 46 may be realized by hardware such as a logic circuit, etc.

The invention claimed is:

1. A communication device comprising:
   a first type of interface for executing wireless communication with a mobile device;
   a second type of interface for executing wireless communication with the mobile device;
   one or more processors; and
   a memory that stores computer-readable instructions therein,
   the communication device being capable of executing, using the second type of interface, a first type of wireless communication in which an access point different from the communication device and the mobile device is not used, and a second type of wireless communication in which the access point is used,
   the computer-readable instructions, when executed by the one or more processors, causing the communication device to execute:
   (a) in a first case where the communication device belongs to a first wireless network for the communication device to execute the first type of wireless communication, executing, using the second type of interface, wireless communication of object data with the mobile device via the first wireless network after sending, using the first type of interface, to the mobile device a first wireless setting, the first wireless setting being for the mobile device to belong to the first wireless network and including a password; and
   (b) in a second case where the communication device belongs to a second wireless network for the communication device to execute the second type of wireless communication, executing, using the second type of interface, wireless communication of the object data with the mobile device via the second wireless network after sending, using the first type of interface, to the mobile device a second wireless setting, the second wireless setting being for the mobile device to belong to the second wireless network and not including the password.

2. The communication device as in claim 1, wherein the computer-readable instructions, when executed by the one or more processors, cause the communication device to execute:
   (c) in a case where the communication device currently belongs to both the first wireless network and the second wireless network, sending to the mobile device via the first type of interface the first wireless setting including the password and not sending to the mobile device via the first type of interface the second wireless setting.

3. The communication device as in claim 1, wherein
   the communication device is capable of selectively operating in one of a plurality of states including a parent station state in which the communication device functions as a parent station of a wireless network, a child station state in which the communication device functions as a child station of the wireless network, and a device state different from the parent station state and the child station state,
   the communication device is capable of executing the first type of wireless communication by operating in either the parent station state or the child station state in the wireless network, and
   in the first case, the computer-readable instructions, when executed by the one or more processors, cause the communication device to execute:
   (a1) executing the wireless communication of the object data with the mobile device via the first wireless network using the second type of interface after sending, using the first type of interface, to the mobile device the first wireless setting including the password, in a case where the communication device operates in the parent station state in the first wireless network; and
   (a2) executing the wireless communication of the object data with the mobile device via the first wireless network using the second type of interface after sending, using the first type of interface, to the mobile device the first wireless setting not including the password in a case where the communication device operates in the child station state in the first wireless network.

4. The communication device as in claim 1, wherein communication speed of the communication using the second type of interface is faster than communication speed of the communication using the first type of interface.

5. The communication device as in claim 1, wherein maximum distance across which the communication device executes the wireless communication with the mobile device using the second type of interface is greater than maximum distance across which the communication device executes the wireless communication with the mobile device using the first type of interface.

6. A communication device configured to selectively operate in one of a plurality of states including a parent station state in which the communication device functions as a parent station of a wireless network, a child station state in which the communication device functions as a child station of the wireless network, and a device state different from the parent station state and the child station state, and configured to execute a specific wireless communication via the wireless network by operating in either the parent station state or the child station state in the wireless network, the communication device comprising:
 a first type of interface for executing wireless communication with a mobile device;
 a second type of interface for executing wireless communication with the mobile device;
 one or more processors; and
 a memory that stores computer-readable instructions therein, the computer-readable instructions, when executed by the one or more processors, causing the communication device to execute:
 in a case where the communication device currently belongs to a specific wireless network for executing the specific wireless communication,
 (a) executing the wireless communication of object data with the mobile device via the specific wireless network using the second type of interface after sending, using the first type of interface, to the mobile device a third wireless setting, the third wireless setting being for the mobile device to belong to the specific wireless network and including a password, in a case where the communication device operates in the parent station state in the specific wireless network; and
 (b) executing the wireless communication of object data with the mobile device via the specific wireless network using the second type of interface after sending, using the first type of interface, to the mobile device a fourth wireless setting, the fourth wireless setting being for the mobile device to belong to the specific wireless network and not including a password, in a case where the communication device operates in the child station state in the specific wireless network.

7. The communication device as in claim 1, wherein communication speed of the communication using the second type of interface is faster than communication speed of the communication using the first type of interface.

8. The communication device as in claim 1, wherein maximum distance across which the communication device executes the wireless communication with the mobile device using the second type of interface is greater than maximum distance across which the communication device executes the wireless communication with the mobile device using the first type of interface.

9. A communication device comprising:
 a first type of interface for executing wireless communication with a mobile device;
 a second type of interface for executing wireless communication with the mobile device; and
 a control unit, wherein
 the communication device is capable of executing, using the second type of interface, a first type of wireless communication in which an access point different from the communication device and the mobile device is not used, and a second type of wireless communication in which the access point is used, and
 the control unit is configured:
 (a) in a first case where the communication device belongs to a first wireless network for the communication device to execute the first type of wireless communication, to execute, using the second type of interface, wireless communication of object data with the mobile device via the first wireless network after sending, using the first type of interface, to the mobile device a first wireless setting, the first wireless setting being for the mobile device to belong to the first wireless network and including a password; and
 (b) in a second case where the communication device belongs to a second wireless network for the communication device to execute the second type of wireless communication, to execute, using the second type of interface, wireless communication of the object data with the mobile device via the second wireless network after sending, using the first type of interface, to the mobile device a second wireless setting, the second wireless setting being for the mobile device to belong to the second wireless network and not including the password.

10. A communication device configured to selectively operate in one of a plurality of states including a parent station state in which the communication device functions as a parent station of a wireless network, a child station state in which the communication device functions as a child station of the wireless network, and a device state different from the parent station state and the child station state, and configured to execute a specific wireless communication via the wireless network by operating in either the parent station state or the child station state in the wireless network, the communication device comprising:
 a first type of interface for executing wireless communication with a mobile device;
 a second type of interface for executing wireless communication with the mobile device; and
 a control unit, wherein in a case where the communication device currently belongs to a specific wireless network for executing the specific wireless communication, the control unit is configured to execute:
 (a) the wireless communication of object data with the mobile device via the specific wireless network using the second type of interface after sending, using the first type of interface, to the mobile device a third wireless setting, the third wireless setting being for the mobile device to belong to the specific wireless network and including a password, in a case where the communication device operates in the parent station state in the specific network; and
 (b) the wireless communication of object data with the mobile device via the specific wireless network using the second type of interface after sending, using the first type of interface, to the mobile device a fourth wireless setting, the fourth wireless setting being for the mobile device to belong to the specific wireless network and not including a password, in a case where the communication device operates in the child station state in the specific network.

11. A non-transitory computer-readable storage medium storing computer-readable instructions for a communication device configured to comprise a first type of interface for executing wireless communication with a mobile device and a second type of interface for executing wireless communication with the mobile device, the communication device being capable of executing, using the second type of interface, a first type of wireless communication in which an access point different from the communication device and the mobile device is not used, and a second type of wireless communication in which the access point is used, the computer-readable instructions, when executed by one or more processors mounted on the communication device, causing the communication device to execute:

(a) in a first case where the communication device belongs to a first wireless network for the communication device to execute the first type of wireless communication, executing, using the second type of interface, wireless communication of object data with the mobile device via the first wireless network after sending, using the first type of interface, to the mobile device a first wireless setting, the first wireless setting being for the mobile device to belong to the first wireless network and including a password; and (b) in a second case where the communication device belongs to a second wireless network for the communication device to execute the second type of wireless communication, executing, using the second type of interface, wireless communication of the object data with the mobile device via the second wireless network after sending, using the first type of interface, to the mobile device a second wireless setting, the second wireless setting being for the mobile device to belong to the second wireless network and not including the password.

12. A non-transitory computer-readable storage medium storing computer-readable instructions for a communication device configured to selectively operate in one of a plurality of states including a parent station state in which the communication device functions as a parent station of a wireless network, a child station state in which the communication device functions as a child station of the wireless network, and a device state different from the parent station state and the child station state, and configured to execute a specific wireless communication via the wireless network by operating in either the parent station state or the child station state in the wireless network, the communication device comprising a first type of interface for executing wireless communication with a mobile device and a second type of interface for executing wireless communication with the mobile device, the computer-readable instructions, when executed by one or more processors mounted on the communication device, causing the communication device to execute:

in a case where the communication device currently belongs to a specific wireless network for executing the specific wireless communication, (a) executing the wireless communication of object data with the mobile device via the specific wireless network using the second type of interface after sending, using the first type of interface, to the mobile device a third wireless setting, the third wireless setting being for the mobile device to belong to the specific wireless network and including a password, in a case where the communication device operates in the parent station state in the specific wireless network; and (b) executing the wireless communication of object data with the mobile device via the specific wireless network using the second type of interface after sending, using the first type of interface, to the mobile device a fourth wireless setting, the fourth wireless setting being for the mobile device to belong to the specific wireless network and not including a password, in a case where the communication device operates in the child station state in the specific wireless network.

* * * * *